(12) United States Patent
Hans

(10) Patent No.: US 12,352,318 B2
(45) Date of Patent: Jul. 8, 2025

(54) ACTUATION DEVICE FOR TWO CLUTCHES AND HYBRID TRANSMISSION AND DUAL-CLUTCH TRANSMISSION

(71) Applicant: Schaeffler Technologies AG & Co. KG, Herzogenaurach (DE)

(72) Inventor: Dominik Hans, Muggensturm (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/556,721

(22) PCT Filed: Apr. 11, 2022

(86) PCT No.: PCT/DE2022/100274
§ 371 (c)(1),
(2) Date: Oct. 23, 2023

(87) PCT Pub. No.: WO2022/237929
PCT Pub. Date: Nov. 17, 2022

(65) Prior Publication Data
US 2024/0200613 A1    Jun. 20, 2024

(30) Foreign Application Priority Data
May 11, 2021   (DE) .......................... 102021112205.8

(51) Int. Cl.
*F16D 23/14*     (2006.01)
*F16D 21/02*     (2006.01)
*F16D 11/00*     (2006.01)

(52) U.S. Cl.
CPC ............. *F16D 23/14* (2013.01); *F16D 21/02* (2013.01); *F16D 2011/002* (2013.01);
(Continued)

(58) Field of Classification Search
CPC .... F16D 23/14; F16D 2023/141; F16D 21/02; F16D 2011/002; F16D 2500/10412; F16D 2500/10462; F16D 2500/1107; B60K 6/20
See application file for complete search history.

(56) References Cited

U.S. PATENT DOCUMENTS 1,826,682 A    10/1931   Thompson
10,995,854 B2 *  5/2021  Schulte ................... F16H 63/30
(Continued)

FOREIGN PATENT DOCUMENTS

DE          8522057      12/1989
DE        102015214534    2/2017
(Continued)

OTHER PUBLICATIONS

Merriam Webster Dictionary for definition adjustment (Year: 2024).*
(Continued)

*Primary Examiner* — Farhana Pervin
(74) *Attorney, Agent, or Firm* — Volpe Koenig

(57) ABSTRACT

An actuation device for actuating two clutches, including a first selector fork, which can be adjusted in a first direction of actuation for actuating a first clutch against a first restoring force, and a second selector fork which can be adjusted in a second direction of actuation for actuating a second clutch against a second restoring force, the first actuation device and the second actuation device being oriented in an opposed manner to each other. Furthermore, a hybrid transmission and a dual-clutch transmission having the actuation device are provided.

10 Claims, 3 Drawing Sheets

(52) U.S. Cl.
CPC .............. *F16D 2023/141* (2013.01); *F16D 2500/10412* (2013.01); *F16D 2500/10462* (2013.01); *F16D 2500/1107* (2013.01)

(56) References Cited

U.S. PATENT DOCUMENTS

| | | | | |
|---|---|---|---|---|
| 2011/0061487 | A1* | 3/2011 | Tooman | F16H 63/304 74/473.36 |
| 2013/0192398 | A1* | 8/2013 | Bowen | F16D 21/06 74/331 |
| 2013/0333517 | A1* | 12/2013 | Osuka | B60W 10/08 903/902 |
| 2014/0358383 | A1* | 12/2014 | Tao | F16H 61/688 701/51 |
| 2017/0051826 | A1 | 2/2017 | Merienne | |
| 2018/0135751 | A1* | 5/2018 | Maki | F16H 63/32 |
| 2019/0085976 | A1* | 3/2019 | Gassmann | F16H 63/304 |
| 2021/0086623 | A1* | 3/2021 | Yao | B60W 30/18172 |
| 2021/0207710 | A1* | 7/2021 | Schmidt | F16H 63/3408 |
| 2022/0153122 | A1* | 5/2022 | Beck | F16H 3/089 |
| 2022/0379711 | A1* | 12/2022 | Gassmann | B60K 6/547 |
| 2023/0392654 | A1* | 12/2023 | Koga | F16D 48/06 |

FOREIGN PATENT DOCUMENTS

| | | |
|---|---|---|
| DE | 102018103245 | 5/2019 |
| WO | 2017140961 | 8/2017 |

OTHER PUBLICATIONS

Machine translation of DE 102015214534 A1 (Year: 2017).*
Definition of articulation (Year: 2000).*

* cited by examiner

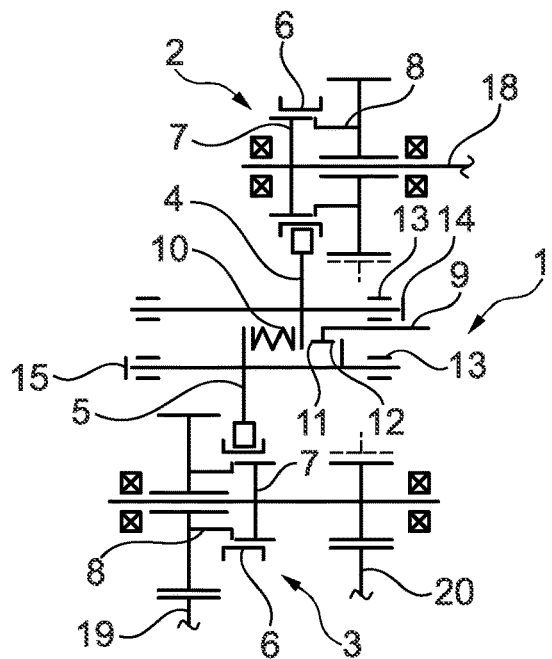
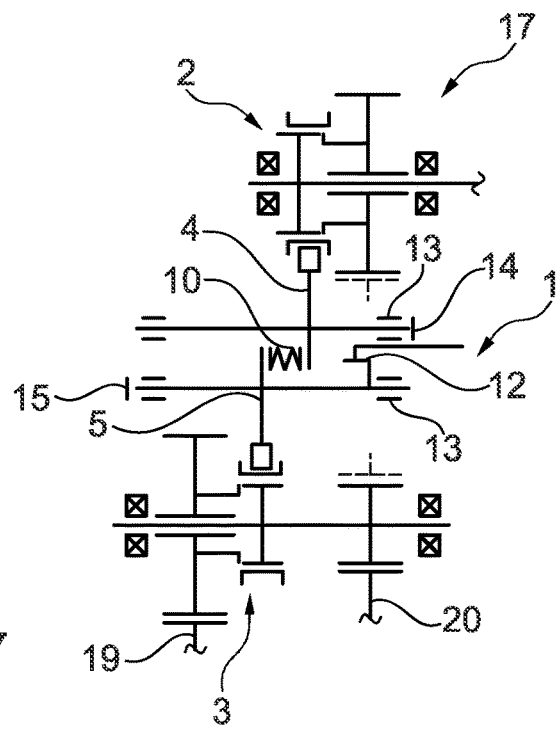
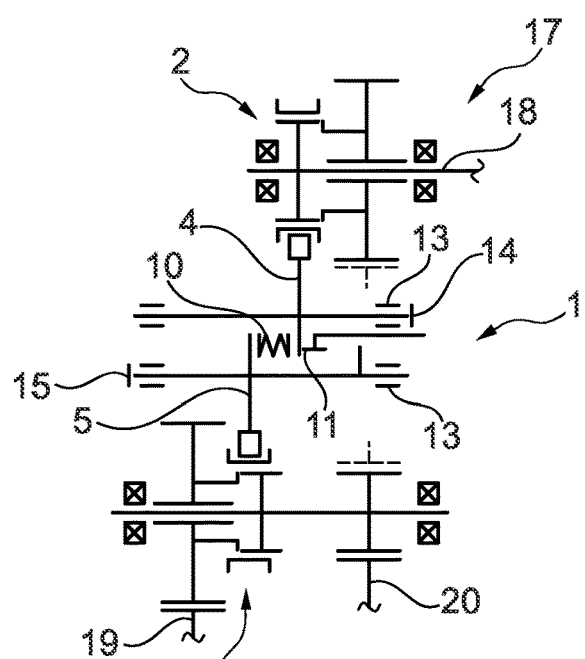
Fig. 1
Fig. 2
Fig. 3

ACTUATION DEVICE FOR TWO CLUTCHES AND HYBRID TRANSMISSION AND DUAL-CLUTCH TRANSMISSION

CROSS-REFERENCE TO RELATED APPLICATIONS

This application is the U.S. National Phase of PCT Appln. No. PCT/DE2022/100274, filed Apr. 11, 2022, which claims priority from German Patent Application No. 10 2021 112 205.8, filed May 11, 2021, the entire disclosures of which are incorporated by reference herein.

TECHNICAL FIELD

The disclosure relates to an actuation device for actuating/switching two clutches, in particular two clutches of a hybrid transmission. The clutches to be actuated can preferably be form-fit clutches, such as dog clutches. Each form-fit clutch can be formed, for example, by a sliding sleeve carrier, a sliding sleeve and a clutch body. The actuation device has a first selector fork which can be adjusted in a first direction of actuation against a first (axial) restoring force in order to actuate, in particular to disengage, a first clutch. The first selector fork can preferably engage in the sliding sleeve of the first clutch to be actuated. The actuation device has a second selector fork which can be adjusted in a second direction of actuation against a second (axial) restoring force in order to actuate, in particular to disengage, a second clutch. The second selector fork can preferably engage in the sliding sleeve of the second clutch to be actuated. In addition, the disclosure relates to a hybrid transmission having such an actuation device and a dual-clutch transmission with such an actuation device.

BACKGROUND

Actuation devices are already known from the prior art. For example, US 2017/0051826 A1 or WO 2017/140961 A1 disclose a clutch actuation for a dog clutch, which is formed from a sliding sleeve carrier, a sliding sleeve and a clutch body, which is realized by means of an actuator and a spring.

In particular in hybrid transmissions comprising two electric machines and an internal combustion engine, as known for example from DE 10 2018 103 245 A1, in which one electric machine is used essentially as a generator and is firmly connected to the internal combustion engine and in which the other electric machine is used essentially as a drive motor/traction motor/a traction machine, it is necessary to be able to switch between different operating modes. In particular, it should be possible to switch between a serial hybrid mode, a parallel hybrid mode and a combustion mode.

A serial hybrid mode is understood to mean that the internal combustion engine no longer has a mechanical/torque-transmitting connection to the drive axle/output shaft. The internal combustion engine drives the first electric machine, which mainly functions as a generator, which in turn supplies the second electric machine, which mainly functions as a traction motor/drive motor, with electricity or charges a battery. The drive axle is driven by the second electric machine. A parallel hybrid mode is understood to mean that the internal combustion engine has a mechanical/torque-transmitting connection to the drive axle/output shaft. The second electric machine can run idle, boost or recuperate. A combustion mode is understood to mean that the second electric machine is decoupled from the drive axle and only the internal combustion engine (with the first electric machine) is connected to the drive axle.

In order to be able to switch between these operating modes, a first clutch (arranged between the internal combustion engine and the output shaft) and a second clutch (arranged between the second electric machine and the output shaft) are used in the hybrid transmission to be able to connect the internal combustion engine and the first electric machine or to be able to connect the second electric machine to the drive axle or separate therefrom.

The prior art, however, always has the disadvantage that it is necessary to be able to actuate the two clutches independently of one another for the desired switching states, which means that when using a known clutch actuation, there is a large or doubled effort.

SUMMARY

It is therefore the object of the disclosure to avoid or at least to mitigate the disadvantages of the prior art. In particular, a robust and cost-effective actuation device for independently actuating two clutches is to be provided.

This object is achieved according to the disclosure in a generic device in that the first direction of actuation and the second direction of actuation are oriented in an opposed manner to each other. This means that the directions of action of the two clutches are opposite to each other, so the geometric arrangement and configuration are selected such that the first direction of actuation is opposite to the second direction of actuation.

This has the advantage that the two clutches can be actuated by a common actuator, but at the same time can be engaged independently of one another. The number of elements required for the actuator system is thus reduced and a particularly cost-effective actuation device is provided. In particular, it is possible to switch between a switching state in which both clutches are engaged, a switching state in which only the first of the two clutches is engaged (and the other is disengaged) and a switching state in which only the second of the two clutches is engaged (and the other is disengaged). By means of the structure according to the disclosure, only one of the two clutches can be disengaged at a time, but both clutches can be engaged independently of one another.

In other words, for example, the two selector forks in an actuation device according to the disclosure can each be acted upon in the axial direction by a preload/restoring force, via which each selector fork is pressed into a closed/engaged switch position, i.e., into a position in which the clutch to be actuated is engaged. Counter to the preload/restoring force (i.e., in the direction of actuation), each selector fork can be pressed into an open/disengaged switch position, i.e., into a position in which the clutch to be actuated is disengaged. By means of the opposite orientation of the preload/restoring forces or the directions of actuation, it is possible to switch the two selector forks via a common actuator, since when the actuator is adjusted in the first direction of actuation, the first selector fork is switched from the engaged switch position to the disengaged switch position, while the second selector fork, via the second restoring force (acting in the direction of the first direction of actuation), remains in the engaged switch position or is returned from the disengaged switch position into the engaged switch position. Consequently, when the actuator is adjusted in the second direction of actuation, the second selector fork is adjusted from the engaged switch position to the disengaged switch position, while the first selector fork, via the first restoring force (acting in the direction of the second direction of actuation), remains in the engaged switch position or is returned from the disengaged switch position into the engaged switch position. In this way, in particular, a particularly simple synchronization apparatus can be realized.

Advantageous embodiments are claimed in the claims and are explained in more detail below.

According to a preferred embodiment, the actuation device can have a (preloaded) spring which is arranged axially between the first selector fork and the second selector fork in such a way that it applies the first restoring force and the second restoring force. This means that the preload acts axially between the two selector forks and the two selector forks are pushed apart by the spring so that the sliding sleeves are each brought into engagement with the clutch body and both form-fit clutches are engaged. As a result, it is sufficient to use a single preload spring, which effects the actuation device in a cost-effective manner.

According to an alternative preferred embodiment, the actuation device can have a first spring for applying the first restoring force and a second spring for applying the second restoring force. In particular, the actuation device can have a (transmission) housing relative to which the first selector fork and the second selector fork can be displaced axially for their adjustment. In the alternative preferred embodiment, the first spring can be arranged between the housing and the first selector fork and/or the second spring can be arranged between the housing and the second selector fork. This means that instead of a single preload spring, two individual preload springs (each acting between a selector fork and the housing) can also be used. The resulting direction of action on the selector fork must remain the same, i.e., opposite to each other.

According to a preferred embodiment, the actuation device can have an actuator with two opposing active surfaces, a first active surface for adjustment acting on the first selector fork and a second active surface for adjustment acting on the second selector fork. According to the direction of actuation of the actuator, the first active surface or the second active surface can be brought into active engagement.

According to a preferred embodiment, the actuator can have three switch positions. In a first switch position, for example in a central position, the actuator does not act on either of the two selector forks. In a second switch position, in which the second active surface presses on the second selector fork, the actuator only acts on the second selector fork (and not on the first selector fork), so the second selector fork pushes the associated sliding sleeve out of its engagement and disengages the second clutch. In a third switch position, in which the first active surface presses on the first selector fork, the actuator only acts on the first selector fork (and not on the second selector fork), so the first selector fork pushes the associated sliding sleeve out of its engagement and disengages the first clutch. It is thus easy to switch between three different operating modes.

According to a preferred embodiment, the actuator is designed to be self-locking. This has the advantage that the actuator only has to be actuated to change between the switch positions and remains in its switch position without being actuated.

According to a preferred embodiment, the actuation device can have a first stop for limiting the maximum adjustability of the first selector fork in the direction of the first restoring force and/or a second stop for limiting the maximum adjustability of the second selector fork in the direction of the second restoring force. The first stop and/or the second stop can preferably be formed on the housing. In other words, the end positions of the selector forks in the closing direction are defined by stops between the respective selector forks and the housing so that the selector fork in the engaged end position (i.e., in the closed/engaged switch position) is prevented from being supported on the sliding sleeve of the clutch to be actuated and, due to the relative rotation, producing frictional heat and thus power losses and wear.

According to a preferred embodiment, the actuation device can have a path limiter for limiting the maximum adjustability in the first direction of actuation and for limiting the maximum adjustability in the second direction of actuation. This advantageously prevents one clutch from being disengaged before the other clutch is engaged when switching between the switching states. The path limiter thus forms a safeguard against unintentional shifting to neutral and an overload protection for the spring. According to the preferred embodiment, the path limiter can be dimensioned such that the maximum adjustability of the two selector forks corresponds to the simple travel path of the sliding sleeve to be actuated by the selector fork. The path limiter can preferably be dimensioned in such a way that the maximum adjustability is limited to 5 to 8 millimeters.

The object of the disclosure is also achieved by a hybrid transmission for a hybrid vehicle having such an actuation device. The hybrid transmission has a first drive shaft which can be connected to an internal combustion engine and to a first electric machine, a second drive shaft which can be connected to a second electric machine, an output shaft which is connected to the first drive shaft and/or to the second drive shaft, a first disconnect clutch for switchably connecting the first drive shaft to the output shaft and a second disconnect clutch for switchably connecting the second drive shaft to the output shaft. The first disconnect clutch and the second disconnect clutch can be actuated/switched by the actuation device according to the i disclosure.

The object of the disclosure is also achieved by a dual-clutch transmission for a motor vehicle with such an actuation device. The dual-clutch transmission has two drive shafts, each of which is connected to an output shaft via a sub-transmission, a first clutch for switching between two gear stages of a first sub-transmission, and a second clutch for switching between two gear stages of a second sub-transmission. The first clutch and the second clutch can be actuated/switched by the actuation device according to the disclosure.

BRIEF DESCRIPTION OF THE DRAWINGS

The disclosure is explained below with the aid of drawings. In the drawings:

FIGS. 1 to 3 show schematic representations of an actuation device according to the disclosure in a first embodiment, used in a hybrid transmission.

DETAILED DESCRIPTION

Figure 4:
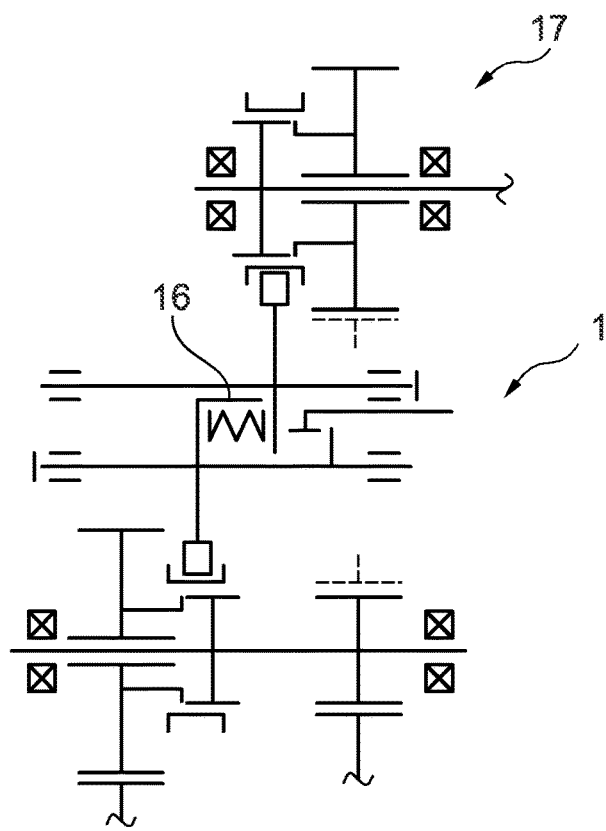
FIG. 4 shows a schematic representation of the actuation device in a second embodiment, used in a hybrid transmission.

The drawings are only schematic in nature and serve only for understanding the disclosure. The same elements are provided with the same reference signs. The features of the individual embodiments can be interchanged.

FIGS. 1 to 3 show schematic representations of an actuation device 1 according to the disclosure in a first embodiment. The actuation device 1 is used to actuate, i.e., to switch, a first clutch 2 and a second clutch 3.

The actuation device 1 has a first selector fork 4. To actuate the first clutch 2, the first selector fork 4 can be adjusted in a first direction of actuation against a first (axial) restoring force. In the embodiment shown in FIGS. 1 to 3, the first axial restoring force acts from left to right, whereas the first direction of actuation is an opposite direction, i.e., a direction from right to left. The first selector fork 4 can be adjusted in the first direction of actuation against the first restoring force in order to disengage the first clutch 2. This means that the first clutch 2 is engaged when the actuation device 1 is in a non-actuated state.

The actuation device 1 has a second selector fork 5. The second selector fork 5 can be adjusted in a second direction of actuation against a second (axial) restoring force in order to actuate the second clutch 3. In the embodiment shown in FIGS. 1 to 3, the second axial restoring force acts from right to left, whereas the second direction of actuation is an opposite direction, i.e., a direction from left to right. The second selector fork 5 can be adjusted in the second direction of actuation counter to the second restoring force in order to disengage the second clutch 3. This means that the second clutch 3 is engaged when the actuation device 1 is in a non-actuated state.

Consequently, the two selector forks 4, 5 are each subjected to a preload/restoring force in the axial direction, by which each selector fork 4, 5 is pressed into a closed/engaged switch position, i.e., into a position in which the clutch 2, 3 to be actuated is engaged. Each selector fork 4, 5 can be pressed into an open/disengaged switch position, i.e., into a position in which the clutch 2, 3 to be actuated is disengaged, against the preload/restoring force (i.e., in the respective directions of actuation).

The first clutch 2 and/or the second clutch 3 can be designed in particular as a form-fit clutch, for example as a dog clutch. The form-fit clutch is formed by a sliding sleeve 6, a sliding sleeve carrier 7 and a clutch body 8. The form-fit clutch is actuated by axial displacement of the sliding sleeve 6. The selector fork 4, 5 engages in the sliding sleeve 6 of the clutch 2, 3 to be actuated so that an (axial) adjustment of the selector fork 4, 5 causes the axial displacement of the sliding sleeve 6.

According to the disclosure, the first direction of actuation and the second direction of actuation are oriented in an opposed manner to each other. This means that the directions of action of the two clutches 2, 3 are opposite. The actuation device 1 has an actuator 9, by means of which the first selector fork 4 and the second selector fork 5 can be actuated jointly but independently of one another. By means of the opposite orientation of the preload/restoring forces or the directions of actuation, it is possible to switch the two selector forks 4, 5 via the common actuator 9.

When the actuator 9 is adjusted in the first direction of actuation (here to the left), the first selector fork 4 is adjusted from the engaged switch position to the disengaged switch position, while the second selector fork 5, by the second restoring force (acting in the direction of the first direction of actuation), remains in the engaged switch position or is returned from the disengaged switching position to the engaged switching position. When actuator 9 is adjusted in the second direction of actuation (here to the right), the second selector fork 5 is adjusted from the engaged switch position to the disengaged switch position, while the first selector fork 4, by the first restoring force (acting in the direction of the second direction of actuation), remains in the engaged switch position or is returned from the disengaged switching position to the engaged switching position. It is thus possible to switch between a first switching state (cf. FIG. 1), in which both clutches 2, 3 are engaged, and a second switching state (cf. FIG. 2), in which only the first clutch 2 is engaged (and the second clutch 3 is disengaged), and a third switching state (cf. FIG. 3), in which only the second clutch 3 is engaged (and the first clutch 2 is disengaged).

The actuation device 1 can preferably have a (preloaded) spring 10 which is arranged axially between the first selector fork 4 and the second selector fork 5 in such a way that it applies the first restoring force and the second restoring force. The spring 10 thus acts axially between the two selector forks 4, 5 so that it pushes the two selector forks 4, 5 apart and the sliding sleeves 6 are each brought into engagement with the clutch body 8 and both form-fit clutches are engaged. Even if this is not shown, the actuation device 1 can alternatively have a first spring for applying the first restoring force and a second spring for applying the second restoring force. In particular, the actuation device 1 can have a (transmission) housing relative to which the first selector fork 4 and the second selector fork 5 can be displaced axially for their adjustment This means that the first spring can be arranged between the housing and the first selector fork 4 and/or the second spring can be arranged between the housing and the second selector fork 5.

The actuator 9 can preferably have two opposing active surfaces 11, 12, wherein a first active surface 11 for adjustment acts on the first selector fork 4 and a second active surface 12 for adjustment acts on the second selector fork 5. In particular, the actuator 9 can have three switch positions. In a first switch position (see FIG. 1), for example in a central position, the actuator 9 does not act on either of the two selector forks 4, 5. In a second switch position (see FIG. 2), in which the second active surface 12 presses on the second selector fork 5, the actuator 9 only acts on the second selector fork 5 (and not on the first selector fork 4) so that the second selector fork 5 pushes the associated sliding sleeve 6 out of its engagement and the second clutch 3 disengages. In a third switch position, in which the first active surface 11 presses on the first selector fork 4, the actuator 9 only acts on the first selector fork 4 (and not on the second selector fork 5) so that the first selector fork 4 moves the associated sliding sleeve 6 out of its engagement and disengages the first clutch 2.

Preferably, the first selector fork 4 and/or the second selector fork 5 can be arranged in an axial guide 13 in the housing.

In particular, the actuator 9 can be designed to be self-locking. This means that the actuator 9 only has to be actuated to change between the switch positions and remains in its switch position without being actuated.

Preferably, the actuation device 1 can have a first stop 14 for limiting the maximum adjustability of the first selector fork 4 in the direction of the first restoring force and/or a second stop 15 for limiting the maximum adjustability of the second selector fork 5 in the direction of the second restoring force. The first stop 14 and/or the second stop 15 can preferably be formed on the housing.

FIG. 4 shows a second embodiment of the actuation device 1, which corresponds to the first embodiment. In addition, the actuation device 1 in the second embodiment can have a path limiter 16 for limiting the maximum adjustability in the first direction of actuation and for limiting the maximum adjustability in the second direction of actuation. The path limiter 16 can preferably be dimensioned in such a way that the maximum adjustability of the two selector forks 4, 5 corresponds to the simple travel path of the sliding sleeve 6 to be actuated by the selector fork 4, 5. For example, the path limiter 16 can be dimensioned in such a way that the maximum adjustability is limited to 5 to 8 millimeters.

In the embodiments shown in FIGS. 1 to 4, the actuation device 1 is used in a hybrid transmission 17. The hybrid transmission 17 has a first drive shaft 18 that can be connected to an internal combustion engine and a first electric machine, a second drive shaft 19 that can be connected to a second electric machine, and an output shaft 20 that can/is connected to the first drive shaft 18 and/or to the second drive shaft 18. The drawings show only part of a gearwheel seated on the second drive shaft 19 or a part of a differential gearwheel seated on the output shaft 20. For the sake of simplicity, the gearwheel and the differential gear are referred to as the second drive shaft 19 and the output shaft 20, respectively. The first clutch 2 is used as a first disconnect clutch 2 for switchably connecting the first drive shaft 18 to the output shaft 20. The second clutch 3 serves as a second disconnect clutch 3 for switchably connecting the second drive shaft 19 to the output shaft 20. The first disconnect clutch 2 and the second separating clutch 3 can be actuated/switched by the actuation device 1 according to the disclosure.

Figure 5:
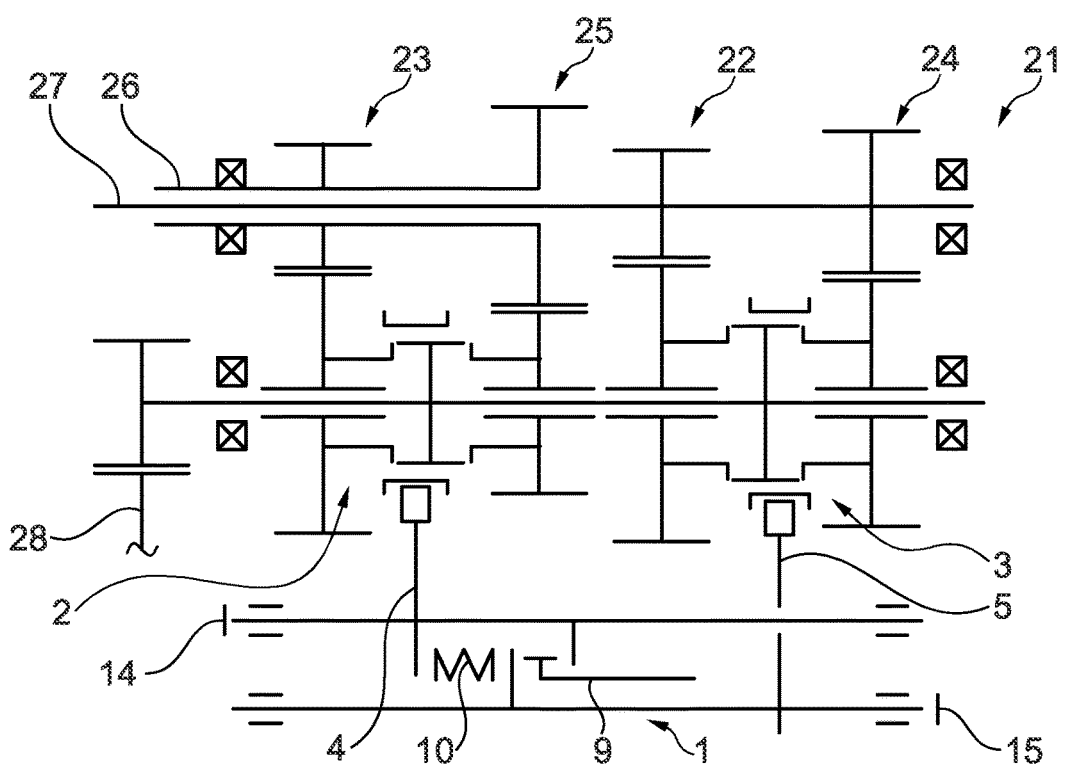
FIG. 5 shows a schematic representation of the actuation device in a third embodiment, used in a dual-clutch transmission.

In the embodiment shown in FIG. 5, the actuation device 1 is used in a dual-clutch transmission 21. Depending on the switch position of the first clutch 2 and the second clutch 3, a first gear stage 22, a second gear stage 23, a third gear stage 24 and/or a fourth gear stage 25 is engaged in order to connect a first drive shaft 26 or a second drive shaft 27 to an output shaft 28. In the unactuated position of the actuator 9, the second gear stage 23 and the third gear stage 24 are engaged. By actuation in the first direction of actuation (here to the right), the second gear stage 23 is disengaged and the fourth gear stage 25 is engaged. By means of an actuation in the second direction of actuation (here to the left), the third gear stage 24 is disengaged and the first gear stage 22 is engaged.

FIGS. 6 to 11 show perspective representations of the actuation device 1 in different switch positions. The actuation device 1 has an actuator 9 in the form of an actuator motor 29. By actuating the actuator motor 29, a nut 30 can be moved (up and down) on a threaded spindle 31. A lever 32 is rotated about a rotary joint 33 by the movement of the nut 30. The lever 32 is connected to the first selector fork 4 at a first articulation point 34 (or a first active surface 11) and to the second selector fork 5 at a second articulation point 35 (or a second active surface 12). By actuating the actuator motor 29, the first selector fork 4 or the second selector fork 5 is displaced axially on a guide rod 36 (or an axial guide 13) against the restoring force of the spring 10.

Figure 6:
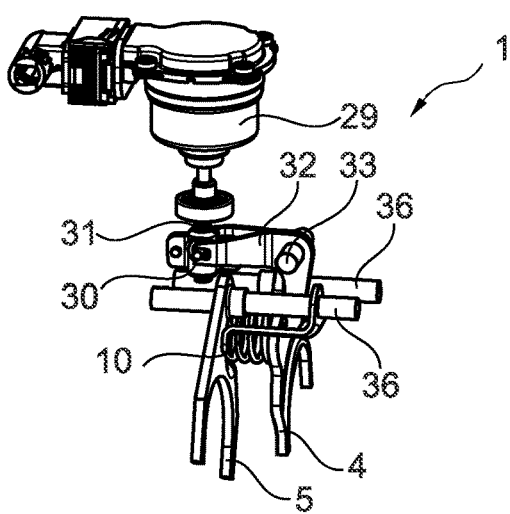
FIGS. 6 to 11 show perspective representations of the actuation device.
Figure 7:
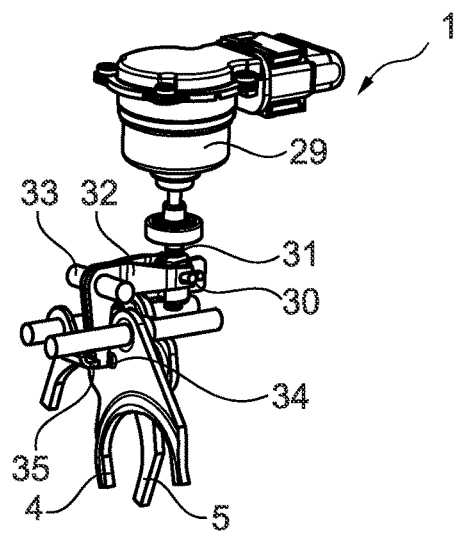
Figure 8:
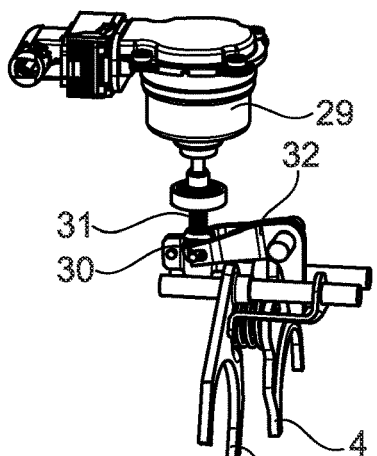
Figure 9:
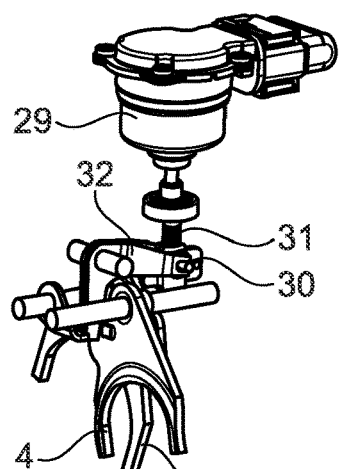
Figure 10:
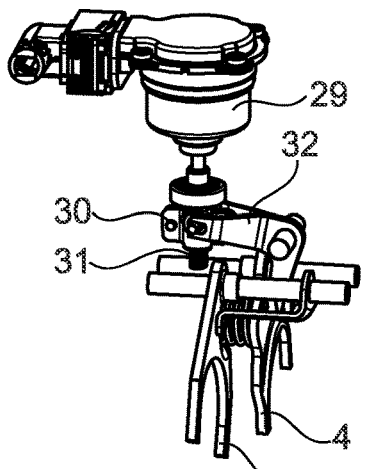
Figure 11:
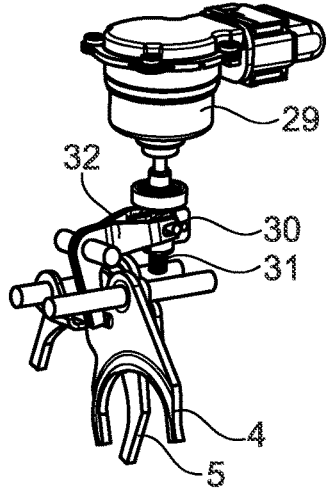

FIGS. 6 and 7 show the actuation device 1 in a central position in which the selector forks 4, 5 are in an unactuated position. FIGS. 8 and 9 show the actuation device 1 in a position in which the nut 30 has moved down, the second selector fork 5 is in an actuated position and the first selector fork 4 is in an unactuated position. FIGS. 10 and 11 show the actuation device 1 in a position in which the nut 30 has moved up, the first selector fork 4 is in an actuated position and the second selector fork 5 is in an unactuated position.

LIST OF REFERENCE SIGNS

1 Actuation device
2 First clutch
3 Second clutch
4 First selector fork
5 Second selector fork
6 Sliding sleeve
7 Sliding sleeve carrier
8 Clutch body
9 Actuator
10 Spring
11 First active surface
12 Second active surface
13 Axial guide
14 First stop
15 Second stop
16 Path limiter
17 Hybrid transmission
18 First drive shaft
19 Second drive shaft
20 Output shaft
21 Dual-clutch transmission
22 First gear stage
23 Second gear stage
24 Third gear stage
25 Fourth gear stage
26 First drive shaft
27 Second drive shaft
28 Output shaft
29 Actuator motor
30 Nut
31 Threaded spindle
32 Lever
33 Rotary joint
34 First articulation point
35 Second articulation point
36 Guide rod

The invention claimed is:

1. An actuation device for actuating two clutches, the actuation device comprising:
 a first selector fork which is adjustable by a lever in a first direction of actuation against a first restoring force in order to actuate a first clutch;
 a second selector fork which is adjustable by the lever against a second restoring force in a second direction of actuation in order to actuate a second clutch; and
 the first direction of actuation and the second direction of actuation are oriented opposite to each other.

2. The actuation device according to claim 1, further comprising a spring which is arranged axially between the first selector fork and the second selector fork such that the spring applies the first restoring force and the second restoring force.

3. The actuation device according to claim 1, further comprising a first spring for applying the first restoring force and a second spring for applying the second restoring force.

4. The actuation device according to claim 1, further comprising an actuator having first and second opposing active surfaces, wherein the first opposing active surface acts on the first selector fork for adjustment thereof, and the second active surface acts on the second selector fork for adjustment thereof.

5. The actuation device according to claim 4, wherein the actuator comprises three switch positions, the actuator in a first of the switch positions acts on none of the two selector forks, in a second of the switch positions only acts on the second selector fork and in a third of the switch positions only acts on the first selector fork.

6. The actuation device according to claim 5, wherein the actuator is self-locking.

7. The actuation device according to claim 1, further comprising at least one of a first stop for limiting a maximum adjustability of the first selector fork in a direction of the first restoring force and a second stop for limiting a maximum adjustability of the second selector fork in a direction of the second restoring force.

8. The actuation device according to claim 1, further comprising a path limiter for limiting a maximum adjustability in the first direction of actuation and for limiting a maximum adjustability in the second direction of actuation.

9. A hybrid transmission for a hybrid vehicle, the hybrid transmission comprising:
  the actuation device according to claim 1,
  a first drive shaft that is connectable to an internal combustion engine and to a first electric machine,
  a second drive shaft which is connectable to a second electric machine,
  an output shaft connected to at least one of the first drive shaft and the second drive shaft,
  a first disconnect clutch for switchably connecting the first drive shaft to the output shaft and a second disconnect clutch for switchably connecting the second drive shaft to the output shaft, the first clutch being the first disconnect clutch and the second clutch being the second disconnect clutch,
  wherein the first disconnect clutch and the second disconnect clutch are actuatable by the actuation device.

10. A dual-clutch transmission for a motor vehicle, the dual-clutch transmission comprising:
  the actuation device according to claim 1,
  two drive shafts, which are respectively connected to an output shaft via a first sub-transmission and a second sub-transmission,
  the first clutch is configured for switching between two gear stages of the first sub-transmission, and the second clutch is configured for switching between two gear stages of the second sub-transmission, wherein the first clutch and the second clutch are actuatable by the actuation device.

* * * * *